United States Patent
Sugeno et al.

(10) Patent No.: US 10,523,027 B2
(45) Date of Patent: Dec. 31, 2019

(54) POWER SUPPLY APPARATUS AND POWER SUPPLY METHOD

(71) Applicant: Sony Corporation, Tokyo (JP)

(72) Inventors: Naoyuki Sugeno, Fukushima (JP); Hiroaki Yoshida, Fukushima (JP); Kazumi Sato, Fukushima (JP); Koji Umetsu, Miyagi (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/308,233

(22) PCT Filed: Mar. 18, 2015

(86) PCT No.: PCT/JP2015/001492
§ 371 (c)(1),
(2) Date: Nov. 1, 2016

(87) PCT Pub. No.: WO2015/186282
PCT Pub. Date: Dec. 10, 2015

(65) Prior Publication Data
US 2017/0070074 A1    Mar. 9, 2017

(30) Foreign Application Priority Data
Jun. 3, 2014 (JP) .................. 2014-114705

(51) Int. Cl.
*H02J 7/00* (2006.01)
*H02J 9/06* (2006.01)
(Continued)

(52) U.S. Cl.
CPC .............. *H02J 7/0068* (2013.01); *H02J 3/32* (2013.01); *H02J 9/062* (2013.01); *H02J 7/34* (2013.01); *H02J 7/35* (2013.01); *Y02B 10/72* (2013.01)

(58) Field of Classification Search
CPC .... H02J 7/0068; H02J 3/32; H02J 7/34; H02J 9/06
(Continued)

(56) References Cited

U.S. PATENT DOCUMENTS 5,142,163 A * 8/1992 Hase ................. H02J 9/062
307/64
5,182,518 A * 1/1993 Stich ................ G01R 31/40
307/66
(Continued)

FOREIGN PATENT DOCUMENTS

EP          2654176      10/2013
JP      2006-141142 A    6/2006
(Continued)

OTHER PUBLICATIONS

International Search Report (with English translation) dated Jun. 9, 2015 in corresponding international application No. PCT/JP2015/001492 (6 pages).
(Continued)

*Primary Examiner* — Brandon S Cole
(74) *Attorney, Agent, or Firm* — K&L Gates LLP

(57) ABSTRACT

Provided is a power supply apparatus including a power storage module, a DC-AC inverter, a bypass circuit, and a controller. The DC-AC inverter converts output of the power storage module into AC power. The bypass circuit directly transmits the AC power. The controller switches between a discharge mode for supplying output of the DC-AC inverter to a load, and a bypass mode for supplying output of the bypass circuit to the load. A threshold for switching between the discharge mode and the bypass mode is set to a range that enables the power storage module to provide output in an overload state.

8 Claims, 10 Drawing Sheets

(51) Int. Cl.
*H02J 3/32* (2006.01)
*H02M 3/04* (2006.01)
*H02J 7/02* (2016.01)
*H02J 7/34* (2006.01)
*H02J 7/35* (2006.01)

(58) Field of Classification Search
USPC .................................................... 307/43–87
See application file for complete search history.

(56) References Cited

U.S. PATENT DOCUMENTS

| | | | | |
|---|---|---|---|---|
| 6,118,676 | A * | 9/2000 | Divan .................. | H02J 3/1814 323/207 |
| 2005/0040786 | A1* | 2/2005 | Ichinose .................. | H02J 7/34 320/101 |
| 2006/0043793 | A1* | 3/2006 | Hjort ...................... | H02J 9/062 307/1 |
| 2012/0074786 | A1* | 3/2012 | Johnson, Jr. ........... | H02J 9/062 307/66 |
| 2012/0306274 | A1 | 12/2012 | Shetler, Jr. et al. | |
| 2013/0264865 | A1* | 10/2013 | Sugeno .................... | H02J 5/00 307/9.1 |
| 2015/0270744 | A1* | 9/2015 | Lacarnoy ................ | H02J 9/061 307/66 |
| 2016/0276870 | A1* | 9/2016 | Olsen ...................... | H02J 9/062 |

FOREIGN PATENT DOCUMENTS

| | | |
|---|---|---|
| JP | 2006141142 | 6/2006 |
| JP | 2006-238514 A | 9/2006 |
| JP | 2010-187532 A | 8/2010 |
| JP | 2011-072068 A | 4/2011 |
| JP | 2013-090524 A | 5/2013 |
| JP | 2013090524 | 5/2013 |
| JP | 2013-233070 A | 11/2013 |

OTHER PUBLICATIONS

Written Opinion dated Jun. 9, 2015 in corresponding international application No. PCT/JP2015/001492 (5 pages).
European Search Reported dated Feb. 16, 2018 for Application No. 15804001.4 (7 pages).
Japanese Office Action dated May 15, 2018 for Japanese App. No. 2016-525670; 5 pages.
Japanese Office Action dated Jul. 10, 2018 for Japanese App. No. 2016-525670; 7 pages.
Chinese Office Action and Search Report dated Sep. 26, 2018 for Chinese App. No. 201580027845.2; (6 pages).
Chinese Office Action for corresponding Chinese Application No. 201580027845.2, dated Sep. 26, 2018; (4 pages).
Chinese Search Report for for corresponding Chinese Application No. 201580027845.2, dated Sep. 26, 2018; (2 pages).
Chinese Office Action dated Sep. 26, 2018 in corresponding Chinese Application No. 201580027845.2.
Chinese Office Action dated May 23, 2019 for Chinese App. No. 2015-800278452; 3 pages.

* cited by examiner

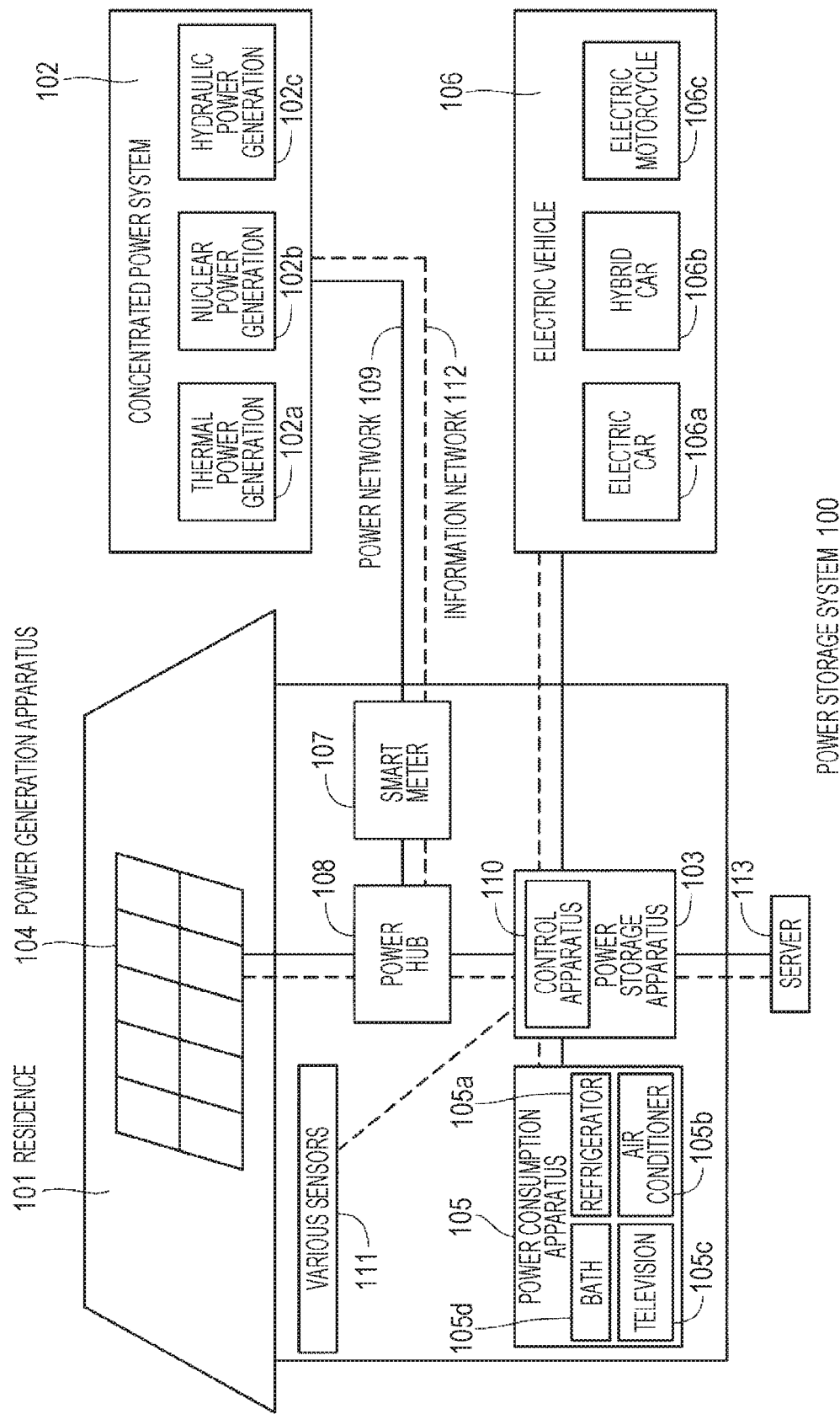

POWER SUPPLY APPARATUS AND POWER SUPPLY METHOD

CROSS-REFERENCE TO RELATED APPLICATIONS

The present application claims the benefit of International Application No. PCT/JP2015/001492, filed Mar. 18, 2015, which claims priority to Japanese Application No. 2014-114705, filed Jun. 3, 2014, the disclosures of which are incorporated herein by reference.

BACKGROUND

The present disclosure relates to a power supply apparatus and a power supply method, capable of using power output from an external power system and a battery module.

When the power supply from an external power system (referred to as a commercial power source, a grid, or the like) decreases by an accident, or the like, or when a power demand seasonally increases, the power demand becomes greater relative to the power supply, leading to a possibility of unexpected power interruption. Other than this case, a power interruption due to a torrential rain, a lightning strike, or the like, is presumed.

It is known in conventional arts that an uninterruptible power supply (hereinafter, referred to as UPS) is used to supply power to a computer and a peripheral device when power failure such as power interruption occurs. The known UPS, however, is effective against a brief power interruption and this merely serves to temporarily supply power to the computer and the peripheral device. Therefore, this is hardly sufficient for supplying residence-based power when a large-scale and long-time power interruption occurs. Furthermore, there is a problem that the UPS operates at the time of power interruption and is not applicable for decreasing residence-based power usage of the external power system, for example.

Recently, a residence-based larger-capacity power storage apparatus is put into practical use. By utilizing the residence-based power storage apparatus, it is possible to ensure power supply at the time of power interruption and thus to reduce the power demand and the power usage of the external power system. For example, one measures would be to reduce the supply of AC power from the external power system to compensate for power shortage by a power storage apparatus (refer to Patent Document 1 below). Furthermore, there might be a problem that residence-based power demand increases to exceed contracted power with a power supplier and a breaker operates to cut off the power. In this case, by supplying power output from a power storage apparatus, it is possible to avoid a situation in which the contracted power is exceeded.

In order to convert DC output of a battery module into AC power supply, a DC-AC inverter is normally used. In case of the UPS, a maximum load (device) value connectable to the UPS is defined as a rated capacity. Furthermore, a capacity (V/Ah) of the battery module included in the UPS is defined. For example, description of DC 12 V/7.2 Ah represents continuation of running DC 12 V/7.2 A for an hour.

For overload, protection is activated. The overload means a state in which a load factor exceeds 100%. The load factor is a ratio of load capacity to UPS rated output capacity. Normal operation is operation in a range where the load factor is 100% or below. Backup time at power interruption can be set longer when the load factor is lower. In general, UPS rated capacity is set in consideration of an expected load. In a recent residence, however, a great-power consumption device such as an electromagnetic cooker is increasingly used, leading to an increased possibility of occurrence of overload.

Exemplary overload protection operation uses a bypass circuit. The bypass circuit is provided, instead of a UPS system, to directly transmit system AC power to a load. In addition to the usage of protecting overload, the bypass circuit is also used at maintenance.

The battery module included in the UPS is connected with a semiconductor switching element (e.g., a field effect transistor (FET)) for cutting off the discharge current in order to prevent the battery from being damaged by excessive discharge current. Furthermore, the module is configured such that a fuse is blown out in a case where excessive discharge current flows.

CITATION LIST

Patent Document

Patent Document 1: JP 2013-233070 A

SUMMARY

Problems to be Solved by the Invention

The UPS, or the like, in the known art is configured to take overload protection measures in consideration of overload capacity and instantaneous overload capacity of the DC-AC inverter. Still, there is a problem of generation of an instantaneous power interruption attributed to insufficient consideration of overcurrent protection of the battery module.

In view of the above, the present disclosure is intended to provide a power supply apparatus and a power supply method, capable of reducing possibility of generation of an instantaneous power interruption by performing overload protection in consideration of overcurrent protection of the battery module.

Solutions to Problems

To solve the above-described problem, a power supply apparatus according to the present disclosure includes a power storage module, a DC-AC inverter, a bypass circuit, and a controller. The DC-AC inverter converts output of the power storage module into AC power. The bypass circuit directly transmits the AC power. The controller switches between a discharge mode for supplying output of the DC-AC inverter to a load, and a bypass mode for supplying output of the bypass circuit to the load. On the power supply apparatus, a threshold for switching between the discharge mode and the bypass mode is set to a range that enables the power storage module to provide output in an overload state.

The present disclosure is a power supply method implemented on a power supply apparatus that includes a power storage module, a DC-AC inverter, a bypass circuit, and a controller. The DC-AC inverter converts output of the power storage module into AC power. The bypass circuit directly transmits the AC power. The controller switches between a discharge mode for supplying output of the DC-AC inverter to a load, and a bypass mode for supplying output of the bypass circuit to the load. The power supply method includes setting a threshold for switching between the discharge mode and the bypass mode, to a range that enables the power storage module to provide output in an overload state.

Effects of the Invention

According to at least one embodiment, switching to the bypass mode is performed in a state where output of the power storage module is possible, and thus, it is possible to prevent instantaneous power interruption due to stopping of power supply at switching. Note that effects described herein are not limited. The effects may be any of the effects described in the present disclosure.

BRIEF DESCRIPTION OF DRAWINGS

FIG. 10 is a block diagram of an application example of the power supply apparatus according to the present disclosure.

DETAILED DESCRIPTION

Hereinafter, embodiments of the present disclosure will be described. Note that, while the embodiments described below are preferred embodiments of the present disclosure, various technically preferable limitations being imposed, the scope of the present disclosure, in the following description, are not to be limited to the described embodiments, unless there is description to limit the present disclosure.

Description of the present disclosure will be provided in the following order.

<1. Embodiment>
<2. Application Example>
<3. Modification Example>

1. Embodiment

"Configuration of Power Supply Apparatus"

Figure 1:
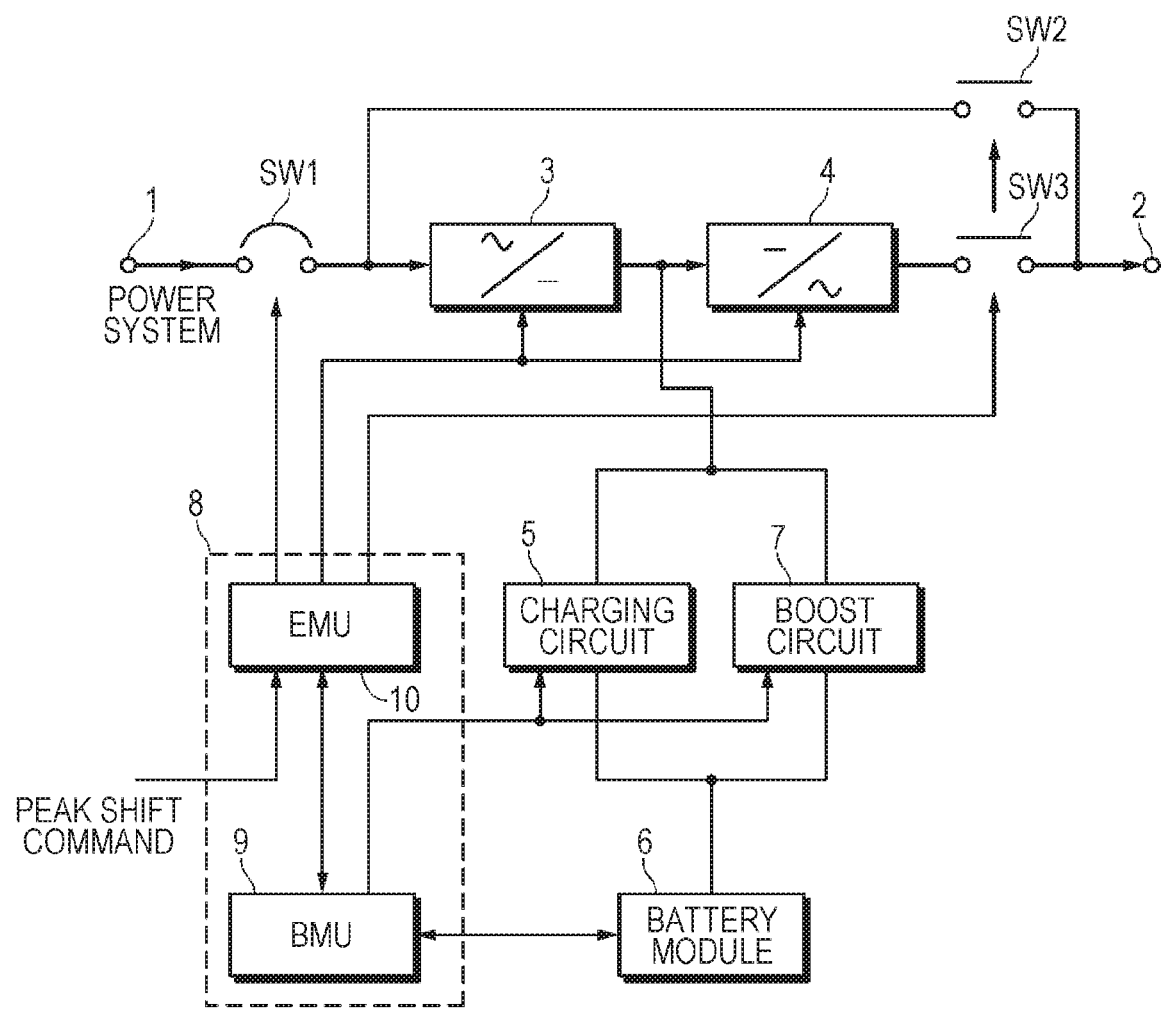
FIG. 1 is a block diagram according to one embodiment of a power supply apparatus according to the present disclosure.

A power supply apparatus (power system) according to the present disclosure will be described with reference to FIG. 1. The power generated at a power station of a power supplier is supplied to a residence-based electricity meter through a power transmission grid (not illustrated) and a power distribution grid (not illustrated) and then AC power is supplied from the electricity meter to an external power system (commercial power) input terminal 1 in FIG. 1. Note that, while the description assumes residence-based power control, the present disclosure may be applied not only to the residence but also to a sectioned area in terms of power supply, such as a plurality of residences (community), building, and a factory.

Typically, a power line is introduced from an outdoor power distribution line into a building through a lead-in wire and is connected to a power meter. A switchboard is connected to the output side of the power meter. Electric appliances are connected to indoor power lines extending from the switchboard. For example, the power supply apparatus according to the present disclosure is disposed between the power meter and the switchboard. A typical residence uses a single-phase three-wire system, specifically, three power lines of a neutral line which is at center, and two voltage lines. The voltage of 100 V can be utilized by using the neutral line and one of the voltage lines. The voltage of 200 V can be utilized by using the two voltage lines. Note that the present disclosure can be applied to a two-wire system.

Commercial power is supplied to an AC power supply terminal 2 via a switch SW1 and a switch SW2. The switch SW1 may be a breaker on the switchboard, in some cases. An indoor power network is connected to the AC power supply terminal 2. Although not illustrated, for example, AC power is supplied to a power distribution panel (including a switchboard) and the power is then supplied to each of electronic devices within an electronic device group through power lines from the power distribution panel, and via outlets. The maximum power for an electronic device connected to one outlet is normally defined as 1500 W. Exemplary electronic devices include air-conditioners, refrigerators, lighting devices, washing machines, television receivers, or the like.

Commercial power is supplied to an AC-DC converter 3 via the switch SW1. The AC-DC converter 3 forms DC power from commercial power. The DC power output from the AC-DC converter 3 is supplied to a DC-AC inverter 4. The DC-AC inverter 4 forms AC power having a level, a phase, and frequency, similar to the case of the commercial power. The AC power output from the DC-AC inverter 4 is extracted to the AC power supply terminal 2 via a switch SW3. Turning on/off of each of the switches SW1, SW2, and SW3 is controlled by a control signal.

A power storage apparatus such as a battery module 6 is connected between the output side of the AC-DC converter 3 and the input side of the DC-AC inverter 4 via a charging circuit 5. As the battery module 6, for example, it is possible to use a configuration in which a battery block is formed using eight cylindrical-shaped lithium-ion rechargeable batteries connected in parallel, and 16 battery blocks connected in series are contained in a common case. It is allowable to use a power storage apparatus including an electric double-layer capacitor and a large-capacity capacitor, instead of the battery module 6. DC power output from the AC-DC converter 3 charges the battery module 6 via the charging circuit 5. Note that the battery module 6 is not limited to a fixed type but also may be one used in an electric vehicle.

DC power output from the battery module 6 is supplied to the DC-AC inverter 4 via a boost circuit 7 as a discharging circuit. The boost circuit 7 boosts DC voltage output from the battery module 6. With the boost circuit 7, it is possible to input higher voltage into the DC-AC inverter 4 and thus to enhance DC-AC conversion efficiency. For example, a DC-DC converter can be used as the boost circuit 7. Note that it is not necessary to provide the boost circuit 7. Alternatively, it is allowable to provide a discharge path of the battery module 6.

A controller 8 is provided for controlling the power system. The controller 8 mainly includes a battery management unit (BMU) 9 and an energy management unit (EMU) 10. The BMU 9 is provided mainly for controlling charging/discharging of the battery module 6. The EMU 10 receives load-side information and generates a control signal for switching the operation mode. Each of the BMU 9 and the EMU 10 includes a micro-control unit, enabling communication between the BMU 9 and the EMU 10.

The BMU 9 monitors states (remaining capacity, battery voltage, battery temperature, or the like) of the battery module 6 and controls the charging circuit 5 and the boost circuit 7 such that appropriate charging/discharging operation is performed. Information on remaining capacity of the battery module 6, obtained by the BMU 9, is transmitted to the EMU 10 and use for switching of operation mode of the EMU 10. The EMU 10 controls the switches SW1, SW2, and SW3, the AC-DC converter 3, and the DC-AC inverter 4. Note that controls of these circuits are performed by turning on/off of an operation power source of the circuit, for example.

A peak shift command is supplied to the EMU 10. The peak shift command is automatically generated at a time zone where the sum of indoor power consumption (load power) becomes relatively high. It is also allowable to configure such that the peak shift command is generated at a user-specified time zone. Furthermore, it is allowable to provide a monitoring section to monitor indoor power, and to generate a peak shift command when the indoor power is about to exceed predetermined power. For example, when contracted power with the supplier might exceed the indoor power, a peak shift command is generated. Furthermore, it is also possible to generate a peak shift command in response to a power limiting command generated by the power supplier. Note that, while the BMU 9 and the EMU 10 are described as separate configurations in the present example, it is allowable to implement and integrate these with one microcomputer, or the like.

"Operation Modes"

The present disclosure enables the following operation modes (drive modes) by control of the controller 8.

Figure 2:
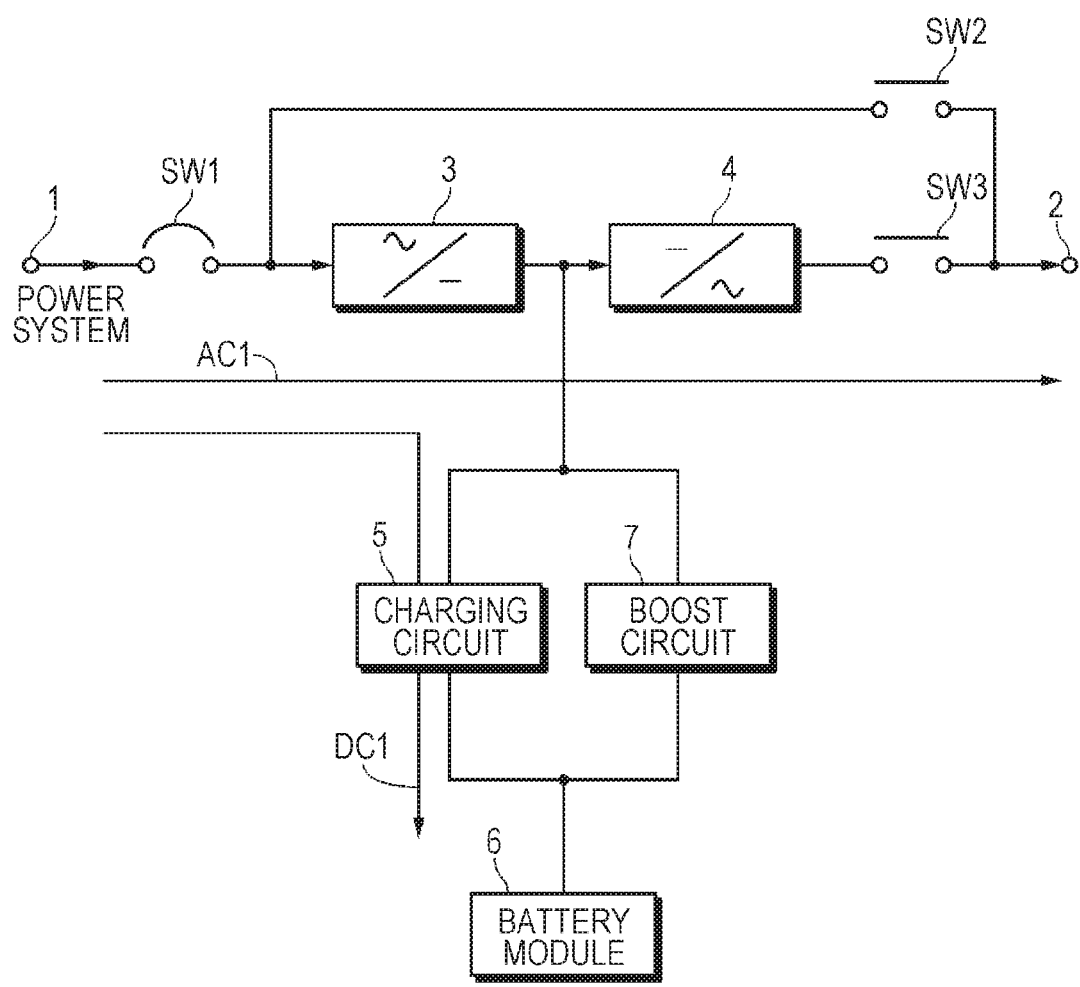
FIG. 2 is a block diagram for illustrating a first operation mode according to one embodiment of the present disclosure.

First operation mode: as illustrated in FIG. 2, commercial power AC1 formed through the AC-DC converter 3 and the DC-AC inverter 4 are merely supplied to the load, and together with this, the battery module 6 is charged by a DC power supply DC1 output by the AC-DC converter 3. The switches SW1 and SW3 are turned on and the switch SW2 is turned off. Note that the path including the switch SW2 is a bypass circuit (bypass system). The switch SW2 remains off at the time of operation within a rated range. Furthermore, the charging circuit 5 is turned on and the boost circuit 7 is turned off. The first operation mode as described is referred to as a charge priority mode.

Figure 3:
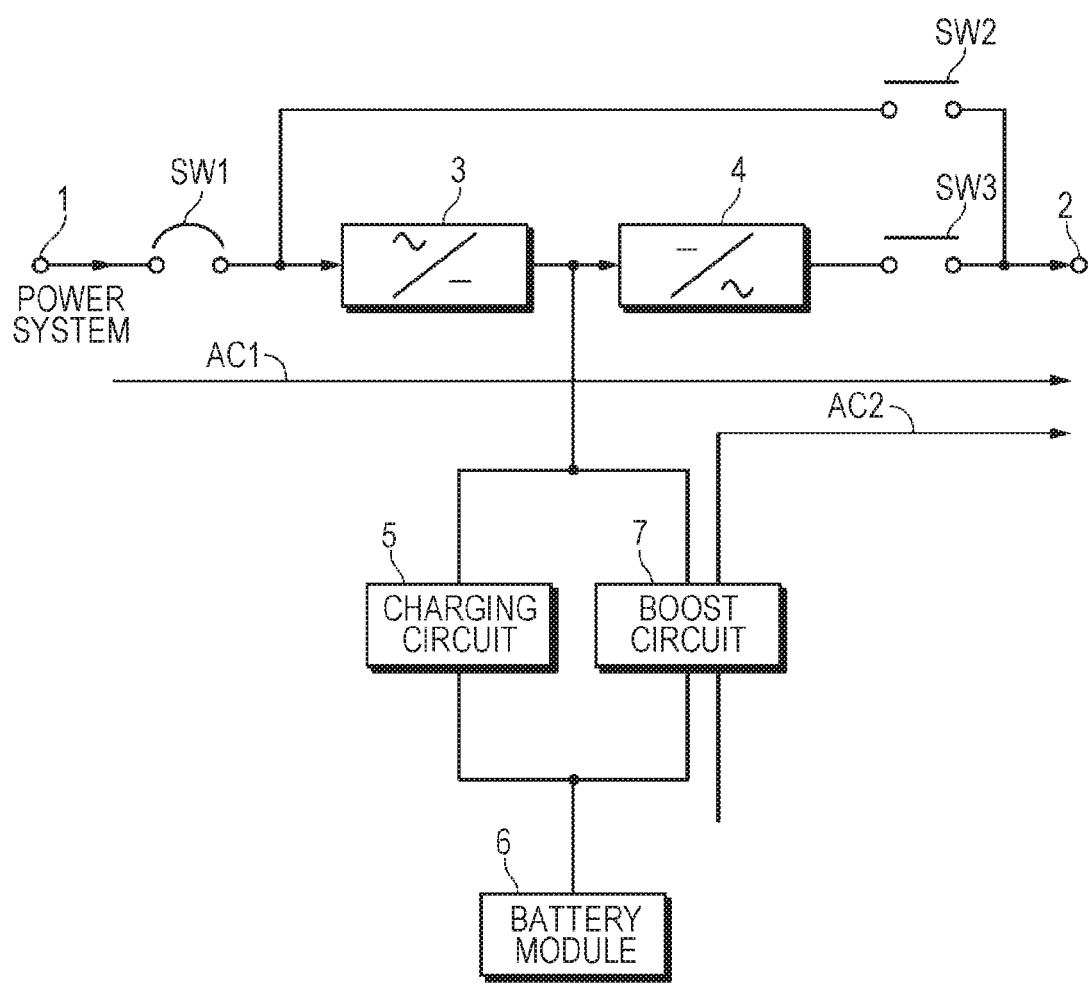
FIG. 3 is a block diagram for illustrating a second operation mode according to one embodiment of the present disclosure.

Second operation mode: as illustrated in FIG. 3, commercial power AC1 formed via the AC-DC converter 3 and the DC-AC inverter 4 and the output of the battery module 6 are boosted, mixed with AC power AC2 formed by the DC-AC inverter 4. Mixing is performed by a DC signal on the output side of the AC-DC converter 3. The switches SW1 and SW3 are turned on and the switch SW2 is turned off. Furthermore, the charging circuit 5 is turned off and the boost circuit 7 is turned on. The second operation mode as described is referred to as a discharge priority mix mode.

Figure 4:
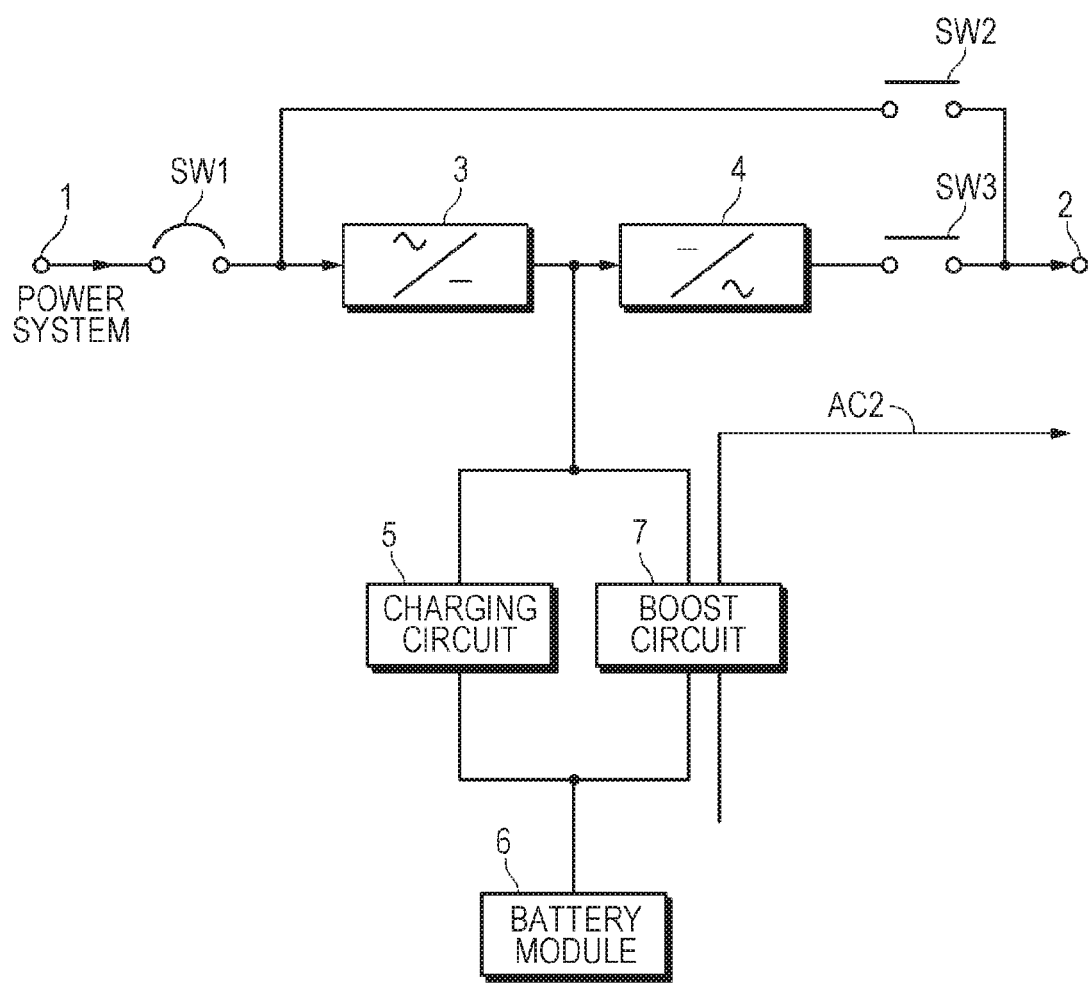
FIG. 4 is a block diagram for illustrating a third operation mode according to one embodiment of the present disclosure.

Third operation mode: as illustrated in FIG. 4, merely the output of the battery module 6 is used. The output of the battery module 6 is boosted, and then the AC power AC2 is formed by the DC-AC inverter 4. This AC power AC2 corresponds to the AC power supply output. This is an operation mode for performing operation similar to the UPS and effective for the time of power interruption, or the like. The third operation mode drive is performed according to a discharge command, in some cases where the battery module 6 is charged by relatively inexpensive power such as night-time power, other than the time of power interruption. The switches SW1 and SW3 are turned on and the switch SW2 is turned off. Furthermore, the AC-DC converter 3 and the charging circuit 5 are turned off, the DC-AC inverter 4 and the boost circuit 7 are turned on. The third operation mode as described is referred to as a discharge priority mode.

Figure 5:
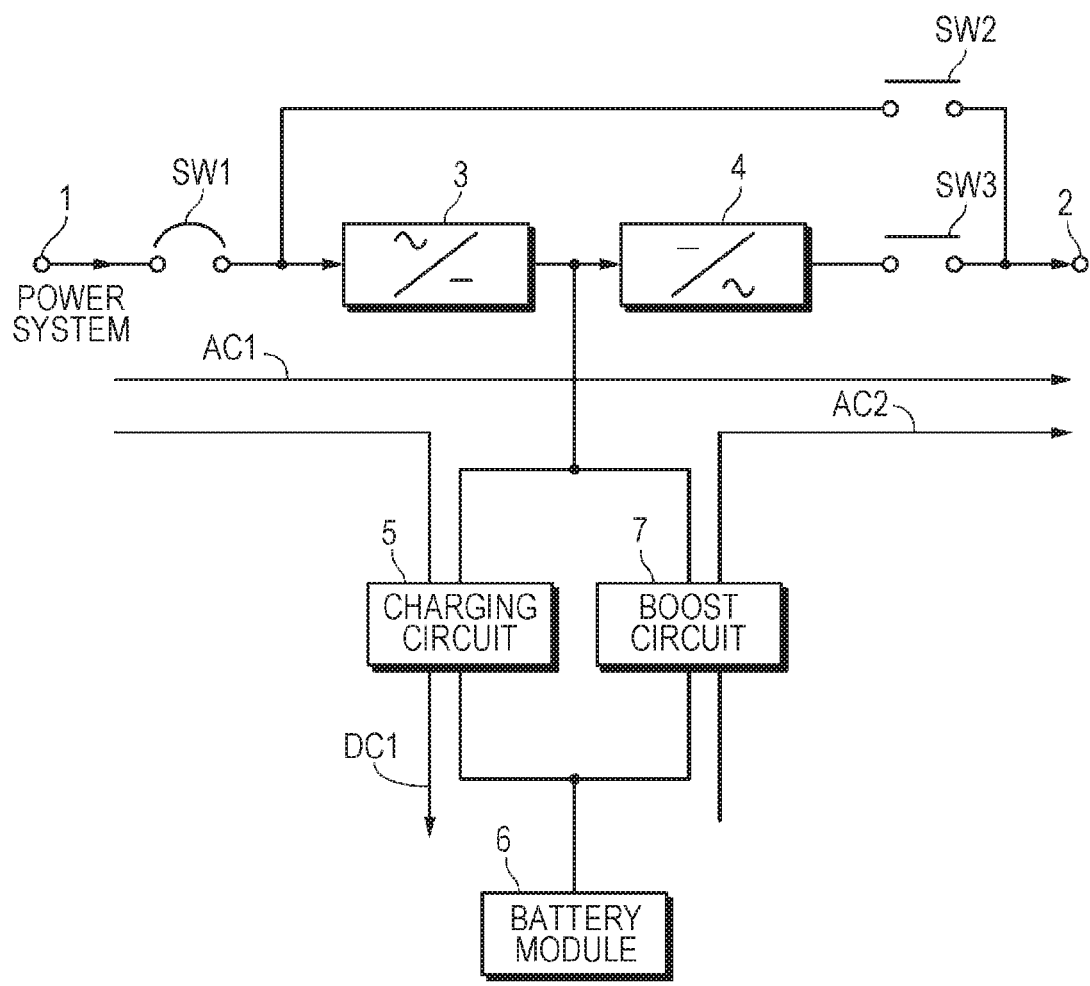
FIG. 5 is a block diagram for illustrating a fourth operation mode according to one embodiment of the present disclosure.

Fourth operation mode: as illustrated in FIG. 5, this is an operation mode including both the charge priority mode and the discharge priority mix mode according to load power. In other words, there is a preset threshold power. In a case where the load power is lower than the threshold power, merely the commercial power AC1 formed through the AC-DC converter 3 and the DC-AC inverter 4 are supplied to the load, and together with this, the battery module 6 is charged by the DC output DC1 of the AC-DC converter 3. In a case where the load power is the threshold power or above, the commercial power AC1 and the output of the battery module 6 are boosted, and mixed with the AC power AC2 formed by the DC-AC inverter 4. Mixing is performed by a DC signal on the output side of the AC-DC converter 3. The switches SW1 and SW3 are turned on and the switch SW2 is turned off. Furthermore, in the charge priority mode, the charging circuit 5 is turned on and the boost circuit 7 is turned off. In the discharge priority mix mode, the charging circuit 5 is turned off and the boost circuit 7 is turned on. The fourth operation mode as described is referred to as a peak shift mode.

Figure 6:
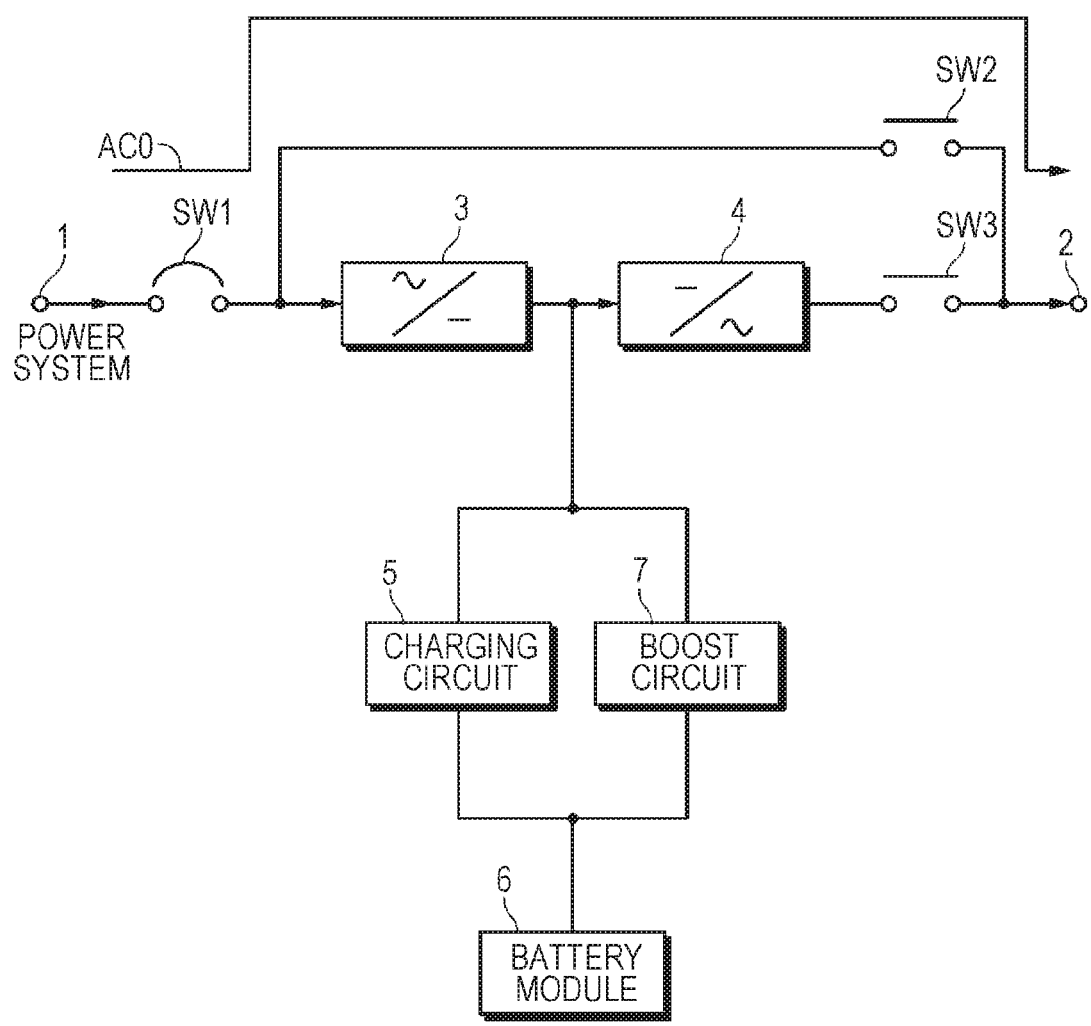
FIG. 6 is a block diagram for illustrating a fifth operation mode according to one embodiment of the present disclosure.

Fifth operation mode: as illustrated in FIG. 6, this is an operation mode in which input commercial power AC0 is extracted as it is to the AC power supply terminal 2. The switches SW1 and SW2 are turned on and the switch SW3 is turned off. Operation states of individual circuits are turned on. The fifth operation mode as described is referred to as a bypass mode. When any abnormality is detected, the mode is automatically switched to the bypass mode. Subsequently, when the abnormality is dissolved, the mode is automatically returned to the original operation mode.

As a modification of the bypass mode, it is possible to provide a maintenance bypass mode for performing maintenance such as battery module replacement and fan inspection. The maintenance bypass mode is an operation mode in which, while individual power supply for each of the AC-DC converter 3, the DC-AC inverter 4, the charging circuit 5, and the boost circuit 7 is turned off, the input commercial power AC0 is extracted to the AC power supply terminal 2 as it is.

"Control by Controller"

Figure 7:
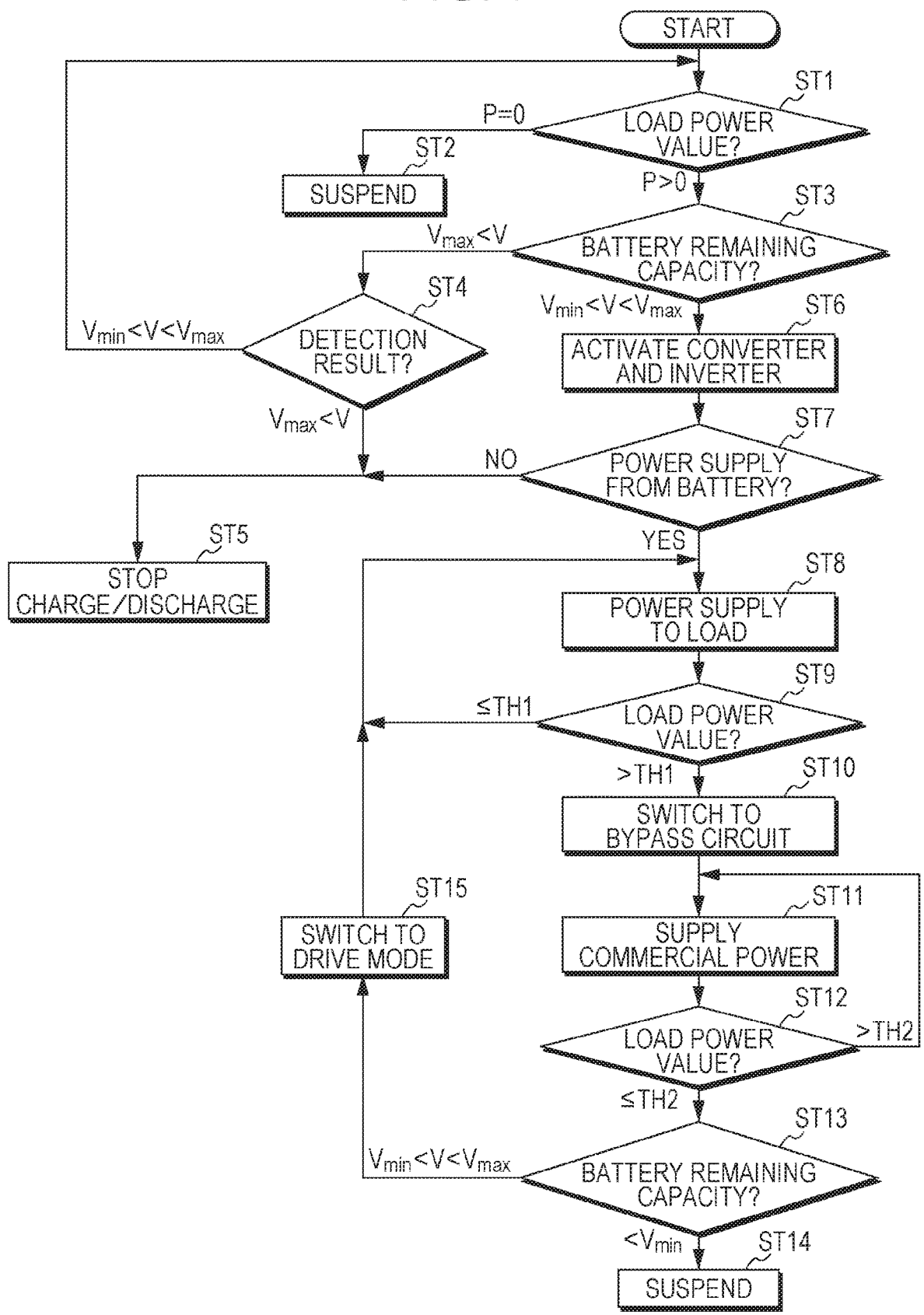
FIG. 7 is a flowchart illustrating operation according to one embodiment of the present disclosure.

The above-described operation mode is selected by the controller 8 according to the remaining capacity of the battery module 6. For example, processing in the case of switching from the above-described discharge priority mode to the bypass mode will be described with reference to the flowchart in FIG. 7.

Step ST1: a load power value is determined. When the load power value P=0, the state becomes a suspension state (step ST2).

Step ST3: whether the battery remaining capacity is in a proper range is examined. In a case where a battery voltage V is between a set minimum value Vmin and a set maximum value Vmax, it is determined as proper. The remaining capacity may be determined by a state of charge (SOC).

Step ST4: in a case where the result of Step ST3 is V>Vmax, whether it is within a proper range is confirmed with reference to a detection result of a detection circuit. When the battery remaining capacity is outside the proper range, the process moves on to step ST5 (stop charge/discharge). In a case where the value is within the proper range, the processing returns to step ST1.

Step ST5: when step ST4 determines that the voltage remaining capacity is not within the proper range, charging/discharging of the battery module 6 is stopped.

Step ST6: the AC-DC converter 3 and the DC-AC inverter 4 are activated.

Step ST7: whether power is to be supplied from the battery module 6 is determined. In a case where power supply is not to be performed, the processing moves to step ST5 (stop charge/discharge).

Step ST8: when it is determined to supply power from the battery module 6, power is supplied from the battery module 6 to the load.

Step ST9: determination is made whether the load power value is greater than a threshold TH1. This is to determine whether the value corresponds to overload. In a case where the load power value is the threshold TH1 or below, the processing returns to step ST7 (determination of whether power is to be supplied from the battery module 6), and power supply is continued.

Step ST10: when step ST9 determines that the load power value is greater than the threshold TH1, the circuit is switched to the bypass circuit (bypass mode).

Step ST11: commercial power is supplied to the load via the bypass circuit (switch SW2).

Step ST12: determination is made whether the load power value is a threshold TH2 or below. This is to determine whether the value is within a rated operation range, not overload. In a case where the load power value is greater than the threshold TH2, the processing returns to step ST11 (supplying commercial power).

Step ST13: when step ST12 determines that the load power value is the threshold TH2 or below, whether the remaining capacity of the battery module 6 is within a proper range is determined. In a case where the remaining capacity is within the proper range, the mode is switched in step ST15 to the original operation mode (drive mode), and thereafter, the processing is returned to step ST8 (supplying load power).

Step ST14: when step ST13 determines that the voltage remaining capacity of the battery module 6 is not within the proper range, operation is suspended.

The above-described threshold TH1 is a determination threshold for a case where the discharge priority mode is switched to the bypass mode, and the threshold TH2 is a determination threshold for a case where the bypass mode is returned to the discharge priority mode. Normally, the threshold is assumed such that TH1>TH2.

Figure 8:
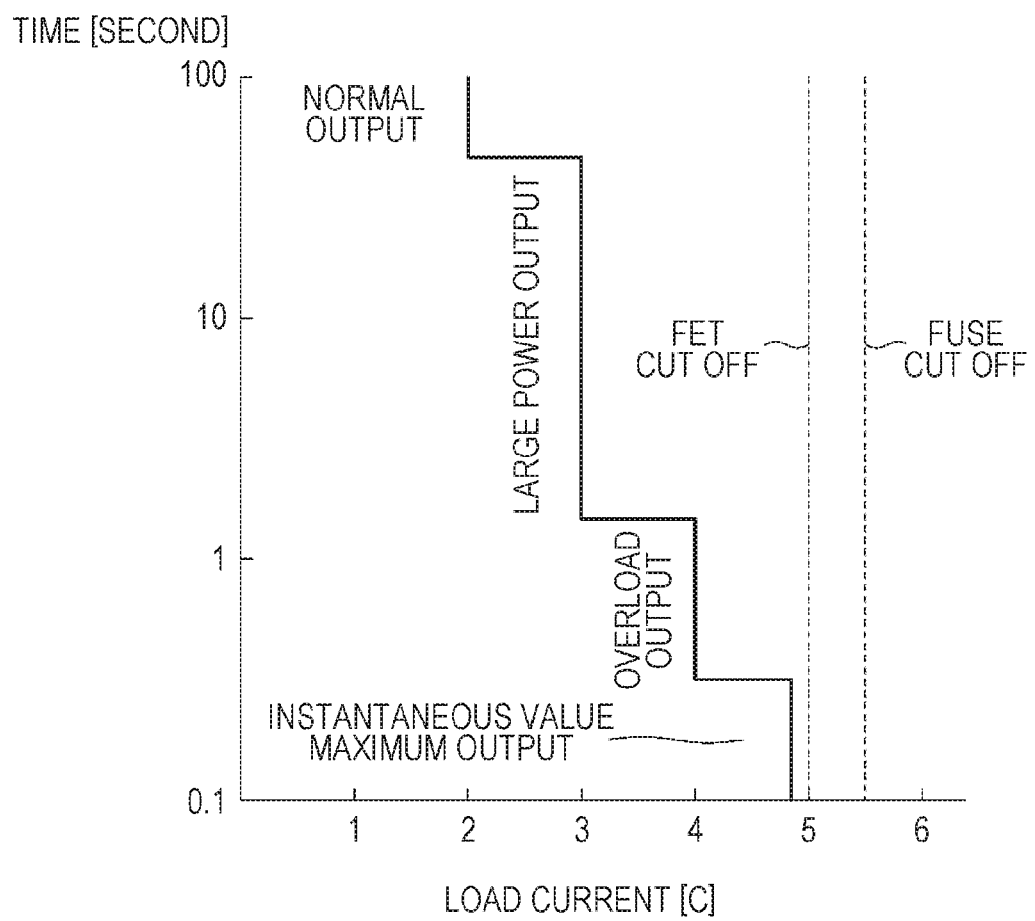
FIG. 8 is a graph for illustrating overload protection operation according to one embodiment of the present disclosure.

An exemplary output characteristic of the battery module 6 will be described with reference to FIG. 8. In FIG. 8, the vertical axis indicates time (second), the horizontal axis indicates load power (discharge current). The unit of load current is C. 1 C is a current value for a case where a cell having a nominal capacity value is discharged at constant current and discharging is completed in one hour. For example, in a cell whose nominal capacity value is 2 Ah, 1 C corresponds to 2 A (1 C=2 A).

In the case of the battery module 6 that uses a typical lithium-ion rechargeable battery as a cell, the load current up to approximately 2 C corresponds to a normal output region. The range 2 C to 3 C corresponds to a large power output region. The load current exceeding 3 C corresponds to an overload region. In the overload region, the battery module 6 can output load current for several seconds (e.g., two to three seconds). Furthermore, the region that exceeds 4 C and substantially up to 5 C is an instantaneous value maximum output region, and thus, the possible output time is one second or below. Subsequently, when the load current reaches 5 C, overcurrent protection is activated to cut off the FET for protection, disconnecting connection with the load. This overcurrent protection can work to prevent abnormal heating due to battery overload. Furthermore, in an abnormal state where even greater load current flows, the fuse is cut off. Consequently, in a case where the battery module 6 having a characteristic illustrated in FIG. 8 is used, the load current below 5 C can be output for a short time.

Figure 9:
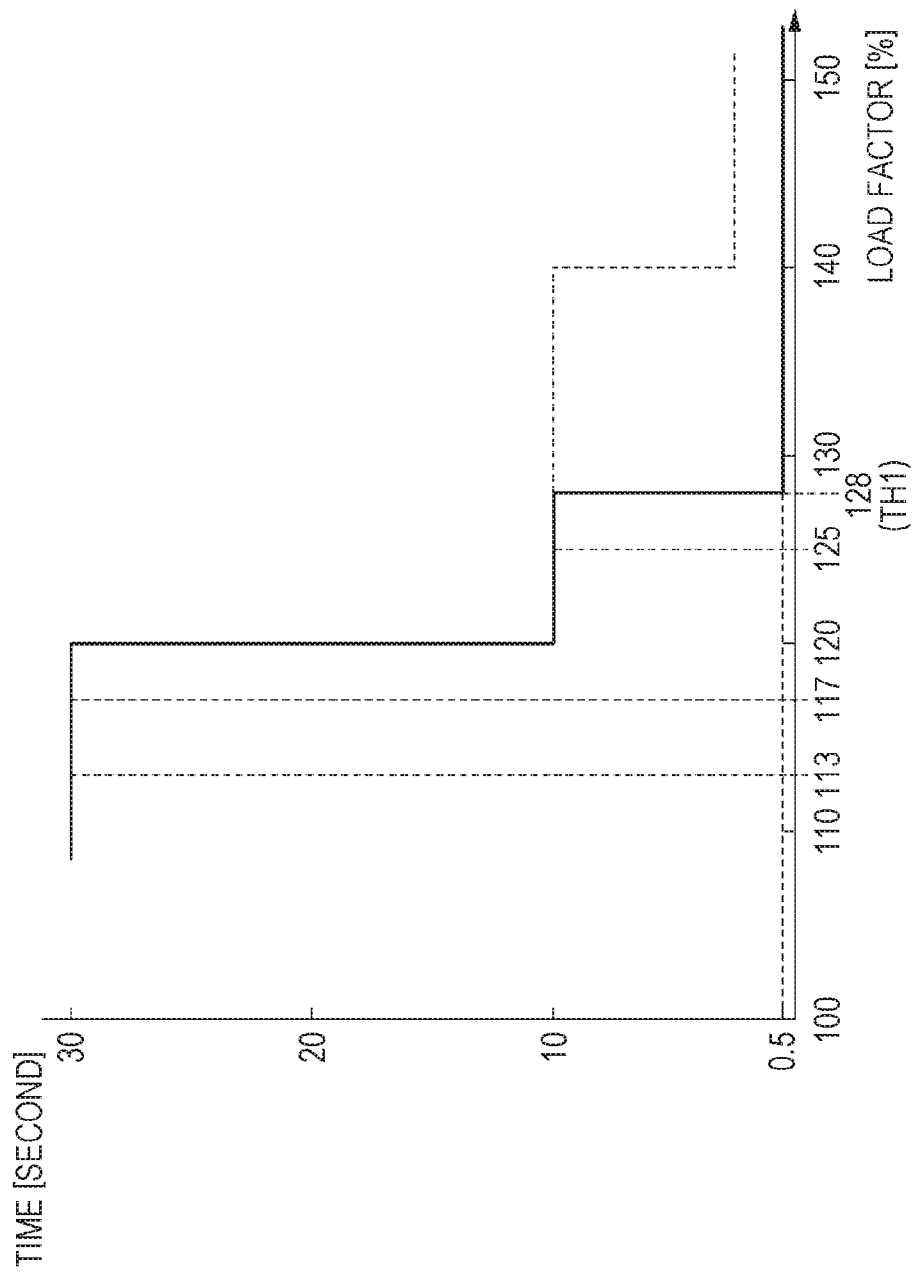
FIG. 9 is a graph for illustrating overload protection operation according to one embodiment of the present disclosure.

Protection at the time of overload will be described with reference to FIG. 9. In FIG. 9, the vertical axis indicates time (second), the horizontal axis indicates the load factor. As described above, the load factor is the ratio of the load capacity to the rated output capacity. Operation within the rated range is operation in a range where the load factor is 100% or below. For example, the DC-AC inverter 4 having rated output of 3.5 kW is used. The instantaneous overload capacity for the DC-AC inverter 4 is assumed, for example, to be 6 kW (load factor=170%).

The battery module 6 enters the overload region when the load current is 3 C or above. In the overload region, overcurrent protection of the controller 8 (BMU 9) is activated to cut off the connection in two seconds, for example. Furthermore, it enters an instantaneous value maximum output region when the load current is 4 C or above. In this region, output can be supplied for one second or less, for example, approximately 0.5 second, until the output is cut off by the FET for protection. Consequently, also in the instantaneous value maximum output region, the battery module 6 can provide output for about 0.5 second.

In assuming overload protection of the DC-AC inverter 4 without consideration of overcurrent protection of the battery module 6, it is merely preferable that the threshold value for switching from the discharge priority mode to the bypass mode, in the output by the battery module 6, be set to 6 kW. In the case where overload protection (FET cut-off) of the battery module 6 is in consideration, a mode switching threshold value is set at, for example, as illustrated in the broken line in FIG. 9, the load factor=142% (=5 kW). This threshold is a value that avoids cut-off of output of the battery module 6, for example, for two seconds, even when overload occurs, and at the same time, since the value is smaller than the instantaneous overload capacity of the DC-AC inverter 4, corresponds to a value that enables mode switching without causing instantaneous power interruption.

In consideration, for example, of a situation where the load is changed from the rated load to overload in a residence, since many of the electronic devices of 200 V have an inverter, the load increases relatively slower. In contrast, in the case of electronic devices of 100 V, when the device is connected to an outlet and the power switch is turned on, the load abruptly increases. Since the typical outlet capacity is 1.5 kW, in a case where the threshold is set at load factor=140% as described above, there is no margin for a situation in which the load abruptly increases, and thus, instantaneous power interruption might occur when the mode is switched to the bypass mode.

Accordingly, in one embodiment of the present disclosure, the mode switching threshold TH1 is set to (load factor=128%=4.5 kW=6 kW−1.5 kW). When the threshold TH1 is exceeded, the mode is switched to the bypass mode while power is supplied excessively for a short time by the battery module 6. Therefore, it is possible to temporarily supply current until output is cut off by FET in the overload state, and thus to allow abrupt load variation. Conventionally, unlike the state in which AC power is output again after output of the battery module 6 is cut off by overcurrent protection, output of the battery module 6 is not interrupted and power supply is not interrupted. With the setting of the threshold TH1, it is possible to surely prevent instantaneous power interruption even in a case where abrupt load variation occurs.

2. Application Example

"Power Storage System in Residence, as Application Example"

Exemplary application of the present disclosure to a power storage system for a residence will be described with reference to FIG. 10. For example, in a power storage system 100 for a residence 101, power is supplied to a power storage apparatus 103 from a concentrated power system 102 including a thermal power generation 102a, a nuclear power generation 102b, and a hydraulic power generation 102c, over a power network 109, an information network 112, a smart meter 107, a power hub 108, or the like. Together with this, power is supplied to the power storage apparatus 103 from an independent power source such as a residence-based power generation apparatus 104. The supplied power is stored in the power storage apparatus 103. The power to be used in the residence 101 is supplied using the power storage apparatus 103. A similar power storage system can be used not only in the residence 101 but also in a building The residence 101 includes the power generation apparatus 104, a power consumption apparatus 105, the power storage apparatus 103, a control apparatus 110 that controls individual apparatuses, the smart meter 107, and a sensor 111 that obtains various types of information. The individual apparatuses are connected over the power network 109 and the information network 112. A solar battery, a fuel battery, or the like, are used as the power generation apparatus 104, and the generated power is supplied to at least one of the power consumption apparatus 105 and the power storage apparatus 103. The power consumption apparatus 105 is a refrigerator 105a, an air conditioner 105b, a television receiver 105c, a bath 105d, or the like. Furthermore, the power consumption apparatus 105 includes an electric vehicle 106. The electric vehicle 106 is an electric car 106a, a hybrid car 106b, and an electric motorcycle 106c.

The power storage apparatus 103 is configured with a rechargeable battery or a capacitor. For example, the power storage apparatus 103 is configured with a lithium ion battery. The lithium ion battery may be a stationary type or may be one used in the electric vehicle 106. The smart meter 107 has a function of measuring usage of commercial power and transmitting the measured usage to an electric power company. The power network 109 may be any one of DC power supply, AC power supply, and noncontact power supply or a combination of a plurality of these. The present disclosure can be applied to the power supply apparatus including the power storage apparatus 103 and the control apparatus 110.

The exemplary various sensors 111 include a human sensor, an illumination sensor, an object detection sensor, a power consumption sensor, a vibration sensor, a contact sensor, a temperature sensor, an infrared sensor. The information obtained by the various sensors 111 is transmitted to the control apparatus 110. Weather conditions, human conditions, or the like, are known by the information from the sensors 111, and accordingly, it is possible to automatically control the power consumption apparatus 105 so as to minimize energy consumption. Furthermore, the control apparatus 110 can transmit information on the residence 101 to an external electric power company, or the like, over the Internet.

The power hub 108 performs processing of power line branching, DC-AC conversion, or the like. Communication systems of the information network 112 connected to the control apparatus 110 include a method of using a communication interface such as a universal asynchronous receiver-transceiver (UART): transmission and reception circuit for asynchronous serial communication, and a method of using a sensor network by a wireless communication standard such as Bluetooth (registered trademark), ZigBee, and Wi-Fi. The Bluetooth (registered trademark) system is applied to multimedia communication and enables communication involving one-to-many connection. The ZigBee uses a physical layer of Institute of Electrical and Electronics Engineers (IEEE) 802.15.4. The IEEE 802.15.4 is a name of a short-distance wireless network standard referred to as Personal Area Network (PAN) or Wireless (W) PAN.

The control apparatus 110 is connected to an external server 113. The server 113 may be managed by any of the residence 101, an electric power company, and a service provider. The information transmitted and received by the server 113 include power consumption information, life pattern information, power rates, weather information, natural disaster information, and information on power transaction. Such information may be transmitted and received by a residence-based power consumption apparatus (a television receiver, for example), and may be transmitted and received by an apparatus outside the residence (e.g. a cellular phone). Such information may be displayed on a device having a display function, e.g. a television receiver, a cellular phone, a personal digital assistant (PDA), or the like.

The control apparatus 110 configures to control individual components includes a central processing unit (CPU), a random access memory (RAM), a read only memory (ROM), and is stored in the power storage apparatus 103 in the present example. The control apparatus 110 is connected to the power storage apparatus 103, the residence-based power generation apparatus 104, the power consumption apparatus 105, the various sensors 111, and the server 113 over the information network 112, and has a function of adjusting usage of commercial power and a power generation amount. Note that the control apparatus 110 may have an additional function of performing power transaction in the power market, or the like.

As described above, not only the power from the concentrated power system 102 such as the thermal power 102a, the nuclear power generation 102b, and the hydraulic power generation 102c but also power generated by the residence-based power generation apparatus 104 (solar power generation, wind power generation) can be stored in the power storage apparatus 103. Therefore, even when the power generated by the residence-based power generation apparatus 104 is varied, it is possible to perform control of keeping electric energy transmitted to the outside constant or discharging only a required amount. For example, it is also possible to employ a form of use in which power obtained by solar power generation is stored in the power storage apparatus 103 and, together with this, midnight power that is low in cost during night is stored in the power storage apparatus 103 and the power stored by the power storage apparatus 103 is discharged to be used in the daytime time zone when the cost is high.

Note that although the present example describes the case in which the control apparatus 110 is stored in the power storage apparatus 103, the control apparatus 110 may be stored in the smart meter 107 or may be configured independently. Furthermore, the power storage system 100 may be used for a plurality of residences in a collective residence, as a target, or may be used for a plurality of detached residences, as a target.

Note that the present disclosure can be configured as follows.

(1)

A power supply apparatus including:
a power storage module;
a DC-AC inverter configured to convert output of the power storage module into AC power;
a bypass circuit configured to directly transmit the AC power; and
a controller configured to switch between a discharge mode for supplying output of the DC-AC inverter to a load, and a bypass mode for supplying output of the bypass circuit to the load,
in which a threshold for switching between the discharge mode and the bypass mode is set to a range that enables the power storage module to provide output in an overload state.

(2)

The power supply apparatus according to (1),
in which the threshold is set to a value smaller than the value of a threshold at output cut-off by overload of the DC-AC inverter.

(3)

The power supply apparatus according to (1),
in which output time in the range that enables the power storage module to provide output in an overload state is longer than time needed to switch between the discharge mode and the bypass mode.

(4)

The power supply apparatus according to (1),
in which the threshold is set to a smaller value in consideration of expected abrupt load variation.

(5)

A power supply method implemented on a power supply apparatus including:
a power storage module;
a DC-AC inverter configured to convert output of the power storage module into AC power;
a bypass circuit configured to directly transmit the AC power; and
a controller configured to switch between a discharge mode for supplying output of the DC-AC inverter to a load, and a bypass mode for supplying output of the bypass circuit to the load,
in which a threshold for switching between the discharge mode and the bypass mode is set to a range that enables the power storage module to provide output in an overload state.

(6)

The power supply method according to (5),
in which the threshold is set to a smaller value than the value of a threshold at output cut-off by overload of the DC-AC inverter.

(7)

The power supply method according to (5),
in which output time in the range that enables the power storage module to provide output in an overload state is longer than time needed to switch between the discharge mode and the bypass mode.

(8)

The power supply method according to (5),
in which the threshold is set to a smaller value in consideration of expected abrupt load variation.

3. Modification Example

Hereinabove, one embodiment of the present disclosure has been described above, while the present disclosure is not limited to the above-described one embodiment, and various modifications can be made on the basis of technical ideas of the present disclosure. The configuration, methods, processes, forms, materials, numerical values, or the like, included in the above-described embodiments and modification examples are merely examples, and different configurations, methods, processes, forms, materials, numerical values or the like from those described are employable as needed. For example, the above-described one embodiment sets one threshold TH1 for switching the normal drive mode to the bypass mode. Alternatively, however, in a case where the overload capacity of a component forming the DC-AC inverter 4 is low, it would be also allowable to configure such that a lower value can be set as the threshold. For example, it is possible to configure such that a threshold (120% value in FIG. 9) having a range enabling the battery module 6 to output large power output can be set. Furthermore, with a configuration that enables setting a plurality of thresholds, it is possible to have a more practical configuration.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

1 external AC power (commercial power) input terminal
2 AC power supply terminal
3 AC-DC converter
4 DC-AC inverter
5 charging circuit
6 battery module
8 controller
9 BMU
10 EMU

The invention claimed is:
1. A power supply apparatus comprising:
a power storage module;
a DC-AC inverter configured to convert output of the power storage module into AC power;
a bypass circuit configured to directly transmit the AC power; and a controller configured to switch between a discharge mode for supplying output of the DC-AC inverter to a load, and a bypass mode for supplying output of the bypass circuit to the load, wherein a threshold for switching between the discharge mode and the bypass mode is set to a range that enables the power storage module to provide output in an overload state of the power storage module, wherein the overload state is a state where a load current output by the power storage module is above a rated operation range of the power storage module, and wherein the threshold is set to a value higher than a second value of a second threshold within the rated operation range of the power storage module, and when the load current output by the power storage module is lower than the second value of the second threshold, the controller switches to the discharge mode.

2. The power supply apparatus according to claim 1, wherein the threshold is set to a value smaller than the value of a threshold at output cut-off by overload of the DC-AC inverter.

3. The power supply apparatus according to claim 1, wherein output time in the range that enables the power storage module to provide output in an overload state is longer than time needed to switch between the discharge mode and the bypass mode.

4. The power supply apparatus according to claim 1, wherein the threshold is set to a smaller value in consideration of expected abrupt load variation.

5. A power supply method implemented on a power supply apparatus comprising:
   a power storage module;
   a DC-AC inverter configured to convert output of the power storage module in AC power;
   a bypass circuit configured to directly transmit the AC power; and
   a controller configured to switch between a discharge mode for supplying output of the DC-AC inverter to a load, and a bypass mode for supplying output of the bypass circuit to the load, wherein a threshold for switching between the discharge mode and bypass mode is set to a range that enables the power storage module to provide output in an overload state of the power storage module, wherein the overload state is a state where a load current output by the power storage module is above a rated operation range of the power storage module, and wherein the threshold is set to a value higher than a second value of a second threshold within the rated operation range of the power storage module, and when the load current output by the power storage module is lower than the second value of the second threshold, the controller switches to the discharge mode.

6. The power supply method according to claim 5, wherein the threshold is set to a value smaller than the value of a threshold at output cut-off by overload of the DC-AC inverter.

7. The power supply method according to claim 5, wherein output time in the range that enables the power storage module to provide output in an overload state is longer than time needed to switch between the discharge mode and bypass mode.

8. The power supply method according to claim 5, wherein the threshold is set to a smaller value in consideration of expected abrupt load variation.

* * * * *